US008945493B2

(12) United States Patent
Ospanov et al.

(10) Patent No.: US 8,945,493 B2
(45) Date of Patent: *Feb. 3, 2015

(54) METHOD FOR EXTRACTION OF BERYLLIUM FROM RAW GENTHELVITE (DANALITE, GENTHELVITE, HELVITE) AND BERTRANDITE (CHRYOSBERL, EUCLASE, BERTRANDITE) MINERAL GROUPS WHEN PROCESSING THE RAW MINERALS (ORES, CONCENTRATES)

(71) Applicants: Habibulla Kusainovich Ospanov, Almaty (KZ); Galymkair Mutanovich Mutanov, Almaty (KZ); Beibit Zholdybaevich Arinov, Ust-Kamenogorsk (KZ); Serik Kasymovich Kozhahmetov, Almaty (KZ); Aishagul Batyrbekovna Baiboldieva, Almaty (KZ); Nazira Habibyllakyzy Ospanova, Almaty (KZ); Vera Anatolevna Rybakova, Ust-Kamenogorsk (KZ)

(72) Inventors: Habibulla Kusainovich Ospanov, Almaty (KZ); Galymkair Mutanovich Mutanov, Almaty (KZ); Beibit Zholdybaevich Arinov, Ust-Kamenogorsk (KZ); Serik Kasymovich Kozhahmetov, Almaty (KZ); Aishagul Batyrbekovna Baiboldieva, Almaty (KZ); Nazira Habibyllakyzy Ospanova, Almaty (KZ); Vera Anatolevna Rybakova, Ust-Kamenogorsk (KZ)

(73) Assignee: Kazakh National University named after Al-Farabi, Almaty (KZ)

( * ) Notice: Subject to any disclaimer, the term of this patent is extended or adjusted under 35 U.S.C. 154(b) by 91 days.

This patent is subject to a terminal disclaimer.

(21) Appl. No.: 13/864,399

(22) Filed: Apr. 17, 2013

(65) Prior Publication Data

US 2014/0314642 A1    Oct. 23, 2014

(30) Foreign Application Priority Data

Apr. 18, 2012    (KZ) .................................. 2012/0455

(51) Int. Cl.
*C22B 59/00*    (2006.01)
*C22B 26/20*    (2006.01)
*C22B 3/10*    (2006.01)

(52) U.S. Cl.
CPC .. *C22B 26/20* (2013.01); *C22B 3/10* (2013.01)
USPC ......................................................... 423/132

(58) Field of Classification Search
None
See application file for complete search history.

(56) References Cited

U.S. PATENT DOCUMENTS

| 1,823,864 | A | * | 9/1931 | Sawyer et al. | 423/132 |
|---|---|---|---|---|---|
| 1,982,873 | A | * | 12/1934 | James | 423/127 |
| 1,998,685 | A | * | 4/1935 | Panebianco et al. | 423/127 |
| 2,092,621 | A | * | 9/1937 | Kjellgren et al. | 423/132 |
| 2,459,895 | A | * | 1/1949 | Schormuller | 423/128 |
| 3,177,068 | A | * | 4/1965 | Mod et al. | 423/132 |
| 3,395,975 | A | * | 8/1968 | Grunig et al. | 423/132 |
| 3,511,597 | A | * | 5/1970 | Surls, Jr. et al. | 423/128 |
| 3,669,649 | A | * | 6/1972 | Olson et al. | 423/132 |
| 3,685,961 | A | * | 8/1972 | Grunig et al. | 423/127 |
| 3,699,208 | A | * | 10/1972 | Grunig et al. | 423/132 |
| 3,704,091 | A | * | 11/1972 | Grunig et al. | 423/128 |
| 3,729,541 | A | * | 4/1973 | Grunig et al. | 423/112 |

FOREIGN PATENT DOCUMENTS

GB          502987      *    3/1939

* cited by examiner

*Primary Examiner* — Steven Bos
(74) *Attorney, Agent, or Firm* — Nadya Reingand

(57) ABSTRACT

The invention relates to non-ferrous metallurgy and can be used for extracting beryllium from genthelvite and bertrandite groups when processing the raw minerals (ores, concentrates) by heap and vat leaching. The objective of the invention is to disclose a method of teaching beryllium from danalite ($Fe_8(BeSiO_4)6S_2$), genthelvite ($Zn_8(BeSiO_4)6S_2$), helvite ($Mg_8(BeSiO_4)6S_2$), chrysoberyl, euclase, and bertrandite, thus expanding the range of raw minerals used for processing and providing more economical production and improved environmental impact via use of an effective reagent at low temperatures by hydrochemical method. The offered method is beneficial both economically and ecologically, as the alternate modern pyrometallurgical method of beryllium extraction has the following drawbacks: emission of toxic gases, high energy requirements, and the need for fireproof materials. The newly developed method is recommended as a basis for the innovative technology of beryllium extraction from genthelvite and bertrandite concentrates and ores.

8 Claims, No Drawings

METHOD FOR EXTRACTION OF BERYLLIUM FROM RAW GENTHELVITE (DANALITE, GENTHELVITE, HELVITE) AND BERTRANDITE (CHRYOSBERL, EUCLASE, BERTRANDITE) MINERAL GROUPS WHEN PROCESSING THE RAW MINERALS (ORES, CONCENTRATES)

CROSS-REFERENCE TO RELATED APPLICATIONS

This invention claims priority to, and incorporates by reference, Kazakhstan Patent Application No 2012/0455.1, filed Apr. 18, 2012, currently this patent application is allowed.

FIELD OF THE INVENTION

The claimed invention relates to the field of non-ferrous metallurgy and can be used for extraction of beryllium from genthelvite (danalite, genthelvite, helvite) and bertrandite (chrysoberyl, euclase, bertrandite) mineral groups when processing the raw minerals (ores, concentrates) by heap and vat leaching methods.

BACKGROUND OF THE INVENTION

All modern methods of beryllium extraction from the minerals mentioned above—in particular, from ore and concentrates of such minerals—exclusively use the pyrometallurgical method at high temperatures. Processing of the beryllium-containing ore can be accomplished in several ways: (a) Melting with alkalis; (b) Sintering with sodium fluorosilicate in different variations; (c) Chlorination (using chlorine gas) with charcoal at a temperature of approximately 800° C.; (d) Roasting the concentrate at a temperature of 1400-1500° C. (US method); (e) Melting-cooling in an electric furnace at 1600-1650° C.

Disadvantages of beryllium extraction by the pyrometallurgical production method include: release of harmful toxic gases, high energy costs, and need for fire-resistant materials, all of which are not economically or environmentally beneficial.

SUMMARY OF THE INVENTION

A more economical and environment-friendly process (compared to known methods) for extraction of beryllium from raw beryllium-containing minerals of the genthelvite group (i.e. danalite, genthelvite, helvite) as well as the bertrandite group (i.e. chrysoberyl, euclase, and bertrandite). The process employs the use of a leaching solution containing technical grade hydrochloric acid at concentrations in the range of 2.5%-20% by volume, as well as potassium chlorate (or calcium hypochlorite) at concentrations in the range of 2%-20%. The leaching solution is placed in contact with the genthelvite or bertrandite material, then mixed and heated at 40-45° C. for up to four (4) hours, allowing for extraction of beryllium from the beryllium-containing minerals.

DETAILED DESCRIPTION OF THE PREFERRED EMBODIMENT

It is highly desirable to replace the high-temperature method of beryllium extraction by a cheaper hydrochemical method employing effective solvents. Beryllium can be extracted from beryllium-containing raw materials, mainly in the form of the following minerals: the genthelvite group (danalite, genthelvite, helvite), then chrysoberyl ($Be(AlO_2)_2$), euclase($Al_2Be_2(Si_2O_8)(OH)_2$), and bertrandite ($Be_4(Si_2O_8)(OH)_2$), then bavenite ($Ca_4(BeAl_2Si_9)_{25})(OH)_2$, phenakite ($Be_2Si_6O_4$), and the beryllium concentrates.

The main objective of this invention is to disclose a novel method, for extracting beryllium from the genthelvite group—danalite ($Fe_8(BeSiO_4)_6S_2$), genthelvite ($Zn_8(BeSiO_4)_6S_2$), helvite ($Mg_8(BeSiO_4)_6S_2$)—and the bertrandite group—chrysoberyl ($Be(AlO_2)_2)$), euclase ($Al_2Be_2(Si_2O_8)(OH)_2$), and bertrandite ($Be_4(Si_2O_8)(OH)_2$). The method expands the potential range of raw minerals used for processing and provides more economical production and improved environmental impact via use of an effective active reagent at low temperatures by a hydrochemical method. This process has no analogs in worldwide application.

The technical result is accomplished using the method of beryllium extraction from beryllium-containing minerals (danalite, genthelvite, helvite, chrysoberyl, euclase, bertrandite) by immersion of monomineral samples of ore or concentrate in a leaching solution containing potassium chlorate (or hypochlorite) in a hydrochloric acid medium, followed by beryllium extraction. One (1) liter of technical potassium chlorate (or hypochlorite) solution is used in concentrations ranging from 2% to 20%, in the presence of 0.5 liter of hydrochloric acid ranging from 2.5% to 20% by volume, with a mixing duration ranging from 30 minutes to 240 minutes at a S:L ratio of 1:5, in a solution heated to 40-45° C. Therefore, the beryllium, leaching from the given product takes a very short amount of time. The role of hydrochloric acid includes not only inhibiting hydrolysis, but producing the stable compound $BeCl_2$, as well as a strong oxidant—hypochlorous acid, $HClO$, by the interaction of potassium chlorate and hydrochloric acid (indirect method).

We have performed experimental studies on the dissolution of monomineral samples of the above-mentioned beryllium-containing minerals in a solution of potassium chlorate in hydrochloric acid medium (Table 1). The mineral purities were as follows: Helvite—99.1; Genthelvite—99.0; Chrysobery—98.4; Bertrandite—98.5; Phenacite—98.3; Beryl—99.0.

Verification of the data was conducted on monomineral samples of helvite, genthelvite, chrysoberyl, euclase, and bertrandite in hydrochloric acid concentrations of 2.5%-20% (by volume) with addition of 20 g of potassium, chlorate (or calcium hypochlorite), using the fractional method of adding 5 g at 4 separate times while mixing for 3-4 hours. The solution was heated to 40-45° C. Under these conditions, the degree of beryllium extraction from the genthelvite group of minerals was 100%, from the chrysoberyl and bertrandite—95% and 91%, respectively, and from euclase—86-89%.

TABLE 1

Extracting beryllium (in %) from genthelvite group (danalite, genthelvite, helvite) and bertrandite group (chrysoberyl, euclase, bertrandite) minerals in a 20% heated solution of potassium chlorate (or calcium hypochlorite) at a temperature of 40-45° C. and during intense mixing for 4 hours in hydrochloric acid medium (20% by volume). 250 g monomineral portion, volume of solution—500 mL.

| Minerals | Hydrochloric acid concentration of 15-20% by volume, and 20%-potassium chlorate solution (or calcium hypochlorite) using fractional method by 5 g Beryllium extraction from minerals, % |
|---|---|
| Helvite | 100.0; 100.0; 100.0; 100.0 |
| Genthelvite | 100.0; 100.0; 100.0; 100.0 |
| Danalite | 100.0; 100.0; 100.0; 100.0 |
| Chrysoberyl | 94.0; 95; 94.5; 94.7; 95.0 |
| Bertrandite | 90.0; 91.0; 90.5; 90.7; 91.0 |
| Euclase | 86.0; 87.0; 88.0; 89.0; 89.0 |

Our preliminary experimental results studying the behavior of helvite, genthelvite, danalite, chrysoberyl, and euclase relative to the concentration of potassium chlorate and hydrochloric acid yielded information about the primary factors influencing the process being studied: concentrations of potassium chlorate and hydrochloric acid, mixing duration, and temperature. As shown in Table 1, minerals of the genthelvite group (danalite, helvite, genthelvite) dissolve almost completely, subsequently only bertrandite group minerals were investigated further.

In order to find the most effective set of optimal conditions for full dissolution of chrysoberyl, bertrandite, and euclase, an orthogonal design for an experiment of the $2^{nd}$ order with <<star shoulder>>$\alpha \pm 1.414$. The experiments were conducted separately for chrysoberyl and bertrandite.

The ratio of components, including concentrations of potassium chlorate and hydrochloric acid used during leaching, was chosen experimentally using the multifactor orthogonal experiment design. Deviations from the design lead to decreases in the degree of beryllium extraction from beryllium-containing raw materials.

In order to find the optimal conditions for dissolution of chrysoberyl and phenacite, the effect of the main factors on complete dissolution of chrysoberyl during processing with a mixture of hydrochloric acid and potassium chlorate (or calcium hypochlorite) was studied, since the interaction of the aforementioned releases free chlorine. The resulting chlorine water (hypochlorous acid) in an acidic medium interacts with the beryllium-containing minerals.

To confirm the technical result of the claimed method, there are several examples of implementation: experiments were performed in a 500 mL leaching solution corresponding to the S:L ratio of 1:5. The degree of extraction was measured by existing methods.

Example 1

Pour 500 mL of 20% solution of potassium chlorate and 20% (by volume) technical hydrochloric acid on 250 g of beryllium-containing minerals. Components were heated to 40-45° C. and stirred for 4 hours. Results of the experiment are shown in Table 2.

Example 2

Test conducted similarly to Example 1, except potassium chlorate content was 15%. Results are shown in Table 2.

Example 3

Test conducted similarly to Examples 1-2, except potassium chlorate content was 10%. Results are shown in Table 2.

Example 4

Test conducted similarly to Examples 1-3, except the potassium chlorate content was 5%. Results are shown in Table 2.

TABLE 2

Results of processing beryllium-containing materials with potassium chlorate solution in hydrochloric acid medium. Weighed portion of 250 g. Volume of Solution is 500 mL.

Test conditions: different concentrations of potassium chlorate; in a hot solution of 40-45° C., with mixing for 4 hours in hydrochloric acid medium (20% by volume).
Beryllium extraction in %

| No. | Beryllium minerals | Example 1 (20% KClO$_3$) | Example 2 (15% KClO$_3$) | Example 3 (10% KClO$_3$) | Example 4 (5% KClO$_3$) |
|---|---|---|---|---|---|
| 1 | Chrysoberyl | 94.3; 95; 95.1; 94.9; 94.8; 94.6 | 90.2; 90.4; 90.1; 90.5; 91.0; 90.7 | 60.5; 60.8; 61.2; 60.3; 60.4; 60.2 | 37.0; 38.0; 39.0; 37.0; 38.2; 37.8 |
| 2 | Bertrandite | 90; 90.5; 90.8; 91.0; 90.4; 90.2 | 85.0; 86.0; 86.5; 86.8; 85.5 | 57.0; 58.0; 59.0; 57.5; 58.2; 58.1 | 35.0; 35.2; 35.8; 35.6; 34.5; 35.1 |

From Example 1 (Table 2), it follows that the claimed method allows carrying out the process in a hot solution of KClO3 (within a concentration range of 15-20%) at a temperature of 40-45° C. with vigorous mixing for 4 hours in hydrochloric acid medium (20% by volume). Beryllium extraction ranges from 91% to 95%. Under conditions for beryllium extraction from chrysoberyl and bertrandite, the degree of extraction of euclases was also measured. For the latter, the extraction was 86-89%, as shown in Table 1.

The developed new method for extraction of beryllium from minerals of genthelvite (danalite, genthelvite, helvite) and bertrandite (chrysoberyl, euclase, bertrandite) groups in context of processing mineral raw materials (ore, concentrate) can be recommended as the basis for innovative technologies for beryllium extraction from minerals of genthelvite (danalite, genthelvite, helvite) and bertrandite (chrysoberyl euclase, bertrandite) group concentrates and ores.

It will be understood by those skilled in the art that various changes in form and details may be made therein without departing from the spirit and scope of the invention as set forth in the appended claims. Those skilled in the art will recognize, or be able to ascertain using no more than routine experimentation, many equivalents to the specific embodiments of the invention described herein. Such equivalents are intended to be encompassed in the scope of the claims.

What is claimed is:

1. A process for extraction of beryllium from beryllium-containing raw genthelvite minerals, beryllium-containing raw bertrandite minerals, or a combination thereof, comprising:

first, contacting the beryllium-containing raw genthelvite minerals, beryllium-containing raw bertrandite minerals, or a combination thereof, with a leaching solution, containing technical grade hydrochloric acid, and second, beryllium extraction, comprising subjecting any of said minerals to a hot solution of potassium chlorate or calcium hypochlorite, in quantities of 15% by volume to 20% by volume, at a temperature of 40-45° C. mixed with the technical grade hydrochloric acid in quantities of 20% by volume and stirring this mixture for up to four (4) hours.

2. A process for extraction of beryllium during processing of beryllium-containing raw minerals, comprising: immersing the raw minerals into a leaching solution, the leaching solution comprising water, technical grade potassium chlorate or calcium hypochlorite, and technical grade hydrochloric acid, then heating and mixing said minerals at a temperature below 100° C. with said leaching solution together for a period of time up to four hours.

3. The process of claim 2, wherein said beryllium-containing raw minerals include danalite, genthelvite, helvite, chrysoberyl, euclase, and bertrandite.

4. The process of claim 2, wherein said leaching solution is comprised of potassium chlorate or calcium hypochlorite, having a concentration ranging from 2% to 20% by volume.

5. The process of claim 2, wherein said leaching solution comprises a hydrochloric acid having a concentration ranging from 2.5% to 20% by volume.

6. The process of claim 2, wherein the mixing duration ranges from 30 minutes to 240 minutes.

7. The process of claim 2, wherein a S:L ratio is 1:5; wherein S:L is a proportion of the beryllium-containing raw minerals to the leaching solution.

8. The process of claim 2, wherein the temperature of the solution is 40-45° C.

\* \* \* \* \*